United States Patent
Kimura

(10) Patent No.: US 7,617,420 B2
(45) Date of Patent: Nov. 10, 2009

(54) TRACE ANALYZING APPARATUS, TRACE ANALYZING METHOD, AND PROCESSOR

(75) Inventor: Katsuyuki Kimura, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 953 days.

(21) Appl. No.: 11/148,330

(22) Filed: Jun. 9, 2005

(65) Prior Publication Data

US 2005/0289400 A1 Dec. 29, 2005

(30) Foreign Application Priority Data

Jun. 29, 2004 (JP) ............................. 2004-191661

(51) Int. Cl.
*G06F 11/00* (2006.01)

(52) U.S. Cl. ....................................................... 714/45

(58) Field of Classification Search ............. 714/30–32, 714/34, 35, 37, 39, 45
See application file for complete search history.

(56) References Cited

U.S. PATENT DOCUMENTS

| | | | |
|---|---|---|---|
| 5,642,478 A * | 6/1997 | Chen et al. ..................... | 714/45 |
| 6,009,270 A * | 12/1999 | Mann .......................... | 717/128 |
| 6,615,371 B2 * | 9/2003 | McCullough et al. ......... | 714/45 |
| 6,732,307 B1 | 5/2004 | Edwards | |
| 7,043,668 B1 * | 5/2006 | Treue et al. .................... | 714/45 |
| 7,058,859 B2 * | 6/2006 | McCullough et al. ......... | 714/45 |
| 7,069,544 B1 * | 6/2006 | Thekkath ..................... | 717/128 |
| 7,080,283 B1 * | 7/2006 | Songer et al. .................. | 714/30 |
| 7,124,072 B1 * | 10/2006 | Thekkath et al. .............. | 703/26 |
| 7,159,101 B1 * | 1/2007 | Thekkath et al. ............. | 712/227 |
| 7,178,133 B1 * | 2/2007 | Thekkath ..................... | 717/128 |
| 7,308,681 B2 * | 12/2007 | Ekanadham et al. ......... | 717/128 |
| 2004/0158776 A1 * | 8/2004 | McCullough et al. ......... | 714/45 |
| 2005/0289399 A1 * | 12/2005 | Kimura ....................... | 714/45 |

OTHER PUBLICATIONS

"EJTAG Trace Control Block Specification", MIPS Technologies Inc., Document No. MD00148, Revision 1.04, Mar. 21, 2002, pp. 1-30 and 39-60.

* cited by examiner

*Primary Examiner*—Nadeem Iqbal
(74) *Attorney, Agent, or Firm*—Oblon, Spivak, McClelland, Maier & Neustadt, L.L.P.

(57) ABSTRACT

A trace analyzing apparatus, which includes a trace analysis table, an instruction reconstruction unit that reconstructs and sends an execution address and an instruction code of trace information, and an object code list storage unit, reads out an object code list and trace information, captures each piece of information in reverse order from the last stored address information stored in an address register, and then registers them in the trace analysis table.

14 Claims, 9 Drawing Sheets

FIG. 3

| | | | | | | | | FORMAT | BIT NUMBER |
|---|---|---|---|---|---|---|---|---|---|
| | | | | | | | 0 | DPF1 | 1 |
| | | | | | | 0 | 1 | DPF2 | 2 |
| | | | | 0 | 0 | 0 | 1 | 1 | DPF3 | 5 |
| | 18 BITS | | | 1 | 0 | 0 | 1 | 1 | DPF4 | 23 |
| 34 BITS | | | | 0 | 1 | 0 | 1 | 1 | DPF5 | 39 |
| | | | | 1 | 1 | 0 | 1 | 1 | DPF6 | 5 |
| | 16 BITS | | 0 | 0 | 0 | 0 | 1 | 1 | 1 | DDF1 | 23 |
| 32 BITS | | | 1 | 0 | 0 | 0 | 1 | 1 | 1 | DDF2 | 39 |
| | | 8 BITS | 0 | 1 | 0 | 0 | 1 | 1 | 1 | DDF3 | 15 |
| | 18 BITS | | 1 | 1 | 0 | 0 | 1 | 1 | 1 | DDF4 | 25 |
| 33 BITS | | | 0 | 0 | 1 | 0 | 1 | 1 | 1 | DDF5 | 40 |
| 65 BITS | | | 1 | 0 | 1 | 0 | 1 | 1 | 1 | DDF6 | 72 |

FIG. 4
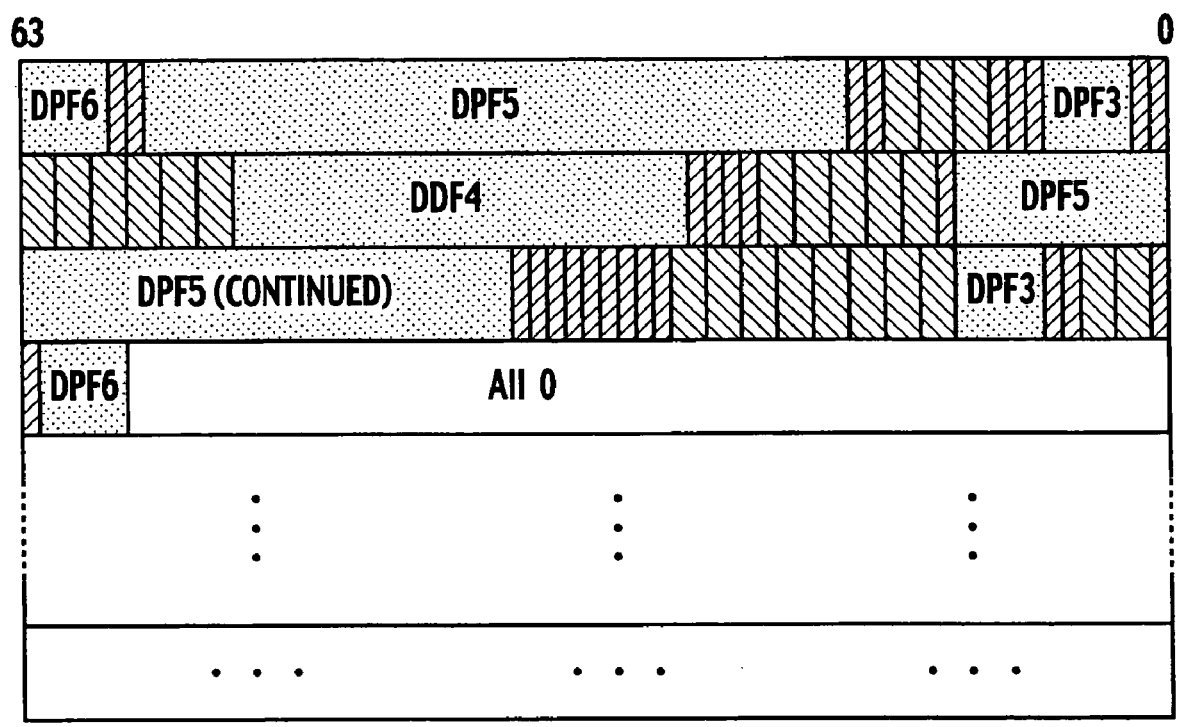
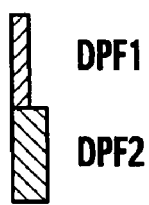

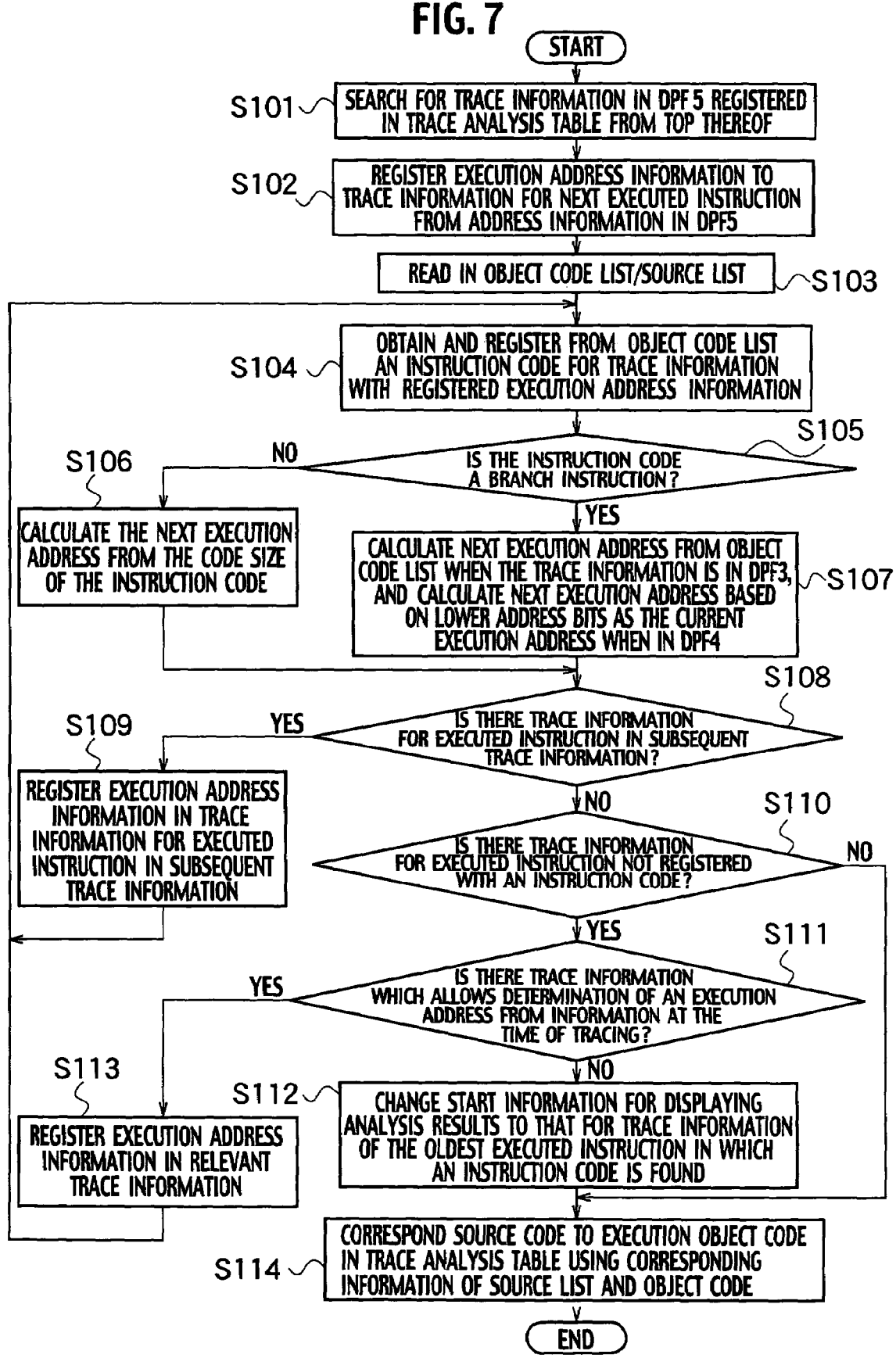

EXECUTION CYCLE          CAPTURED TRACE INFORMATION

| CYCLE NUMBER | TRACE INFORMATION |
|---|---|
|  | DPF6 |
| -54 | DPF1 |
| -53 | DPF1 |
| -52 | DPF5 |
| -51 | DPF1 |
| -50 | DPF1 |
| -49 | DPF2 |
| -48 | DPF2 |
| -47 | DPF2 |
| -46 | DPF1 |
| ... | ... |
| -35 | DPF2 |
| -35 | DDF4 |
| ... | ... |
| -15 | DPF1 |
| -14 | DPF2 |
| -13 | DPF2 |
| ... | ... |
| -8 | DPF2 |
| -7 | DPF2 |
| -6 | DPF3 |
| -5 | DPF1 |
| -4 | DPF1 |
| -3 | DPF2 |
| -2 | DPF2 |
| -1 | DPF1 |
| 0 | DPF1 |
|  | DPF6 |

| ADDRESS INFORMATION | TRACE INFORMATION |
|---|---|
|  | DPF6 |
|  | DPF1 |
|  | DPF1 |
| ADDR5 | DPF5 |
|  | DPF1 |
|  | DPF1 |
| ADDR4 | DPF2 |
| ADDR4+2 | DPF2 |
| ADDR4+4 | DPF2 |
|  | DPF1 |
| ... | ... |
| ADDR3+10 | DPF2 |
| ADDR3+10 | DDF4 |
| ... | ... |
|  | DPF1 |
| ADDR2 | DPF2 |
| ADDR2+2 | DPF2 |
| ... | ... |
| ADDR2+10 | DPF2 |
| ADDR2+12 | DPF2 |
| ADDR2+14 | DPF3 |
|  | DPF1 |
|  | DPF1 |
| ADDR1 | DPF2 |
| ADDR1+2 | DPF2 |
|  | DPF1 |
|  | DPF1 |
|  | DPF6 |

US 7,617,420 B2

TRACE ANALYZING APPARATUS, TRACE ANALYZING METHOD, AND PROCESSOR

CROSS REFERENCE TO RELATED APPLICATIONS AND INCORPORATION BY REFERENCE

This application is based upon and claims the benefit of priority from prior Japanese Patent Application P2004-191661 filed on Jun. 29, 2004; the entire contents of which are incorporated by reference herein.

BACKGROUND OF THE INVENTION

1. Field of the Invention

The present invention relates to a trace analyzing apparatus and a trace analyzing method. More specifically, it relates to a trace analyzing apparatus, a trace analyzing method, and a processor, which analyze trace information stored in a trace memory and allows display of the dynamic program execution status of the processor.

2. Description of the Related Art

Recent microprocessors have been required not only to provide a higher operating performance at a higher operating frequency, but also to support a decrease in the development time of a processor embedded system. In development of a processor or a processor embedded system, analysis of information (trace information) of the flow of a program executed by the processor and data update information is effective to decrease development time. Therefore, technologies including a processor capable of externally outputting trace information and an in-circuit emulator (ICE) or the like, which analyzes the flow of an executed program and updated data based on the extracted trace information, have been developed and provided.

Development of higher-speed processors makes it difficult to capture a signal for analysis. Therefore, development of technologies for reducing the number of signals to be output in real time by compressing processor trace information, and development of technologies for storing trace information in a memory in real time by providing memory in the processor are being pursued. A method using a variable length trace storage format, which allows storage of as much trace information as possible in an internal memory of the processor, is well-known (See, "EJTAG Trace Control Block Specification", MIPS Technologies Inc. Document Number: MD00148, Revision 1.04, Mar. 21, 2002, P. 3-6, for example.).

However, there is a disadvantage in that when storing trace information of this variable length trace storage format in a memory (trace memory), units of variable length data cannot be stored in that memory without leaving vacant areas in the memory. Consequently, useless data is entered in the vacant areas.

In other words, when using the variable length trace storage format, in order to analyze stored trace information, 4-bit information needed for finding the start address of trace information, which is stored in each word (64 bits) area of the trace memory, is typically stored in the lower bits [3:0]. Therefore, 1/16 of the trace memory capacity cannot be used for storing trace information. Furthermore, the start addresses of respective pieces of trace information, each indicated by that 4-bit information, are at 4-bit intervals, and when the end address of the immediately preceding trace information is not multiples of 4 minus 1, useless data is entered, preventing storage of a maximum amount of trace information in the memory.

SUMMARY OF THE INVENTION

An aspect of the present invention inheres in a trace analyzing apparatus, which includes: a trace analysis table that registers trace information; an object code list storage unit that stores a program object/source code list; and an instruction reconstruction unit, wherein the trace analyzing apparatus is connected to a tracer.

Another aspect of the present invention inheres in A trace analyzing method, which includes: inputting trace information, which is compressed and converted to differing length formats, to a trace analysis table in accordance with last stored address information in the trace information; analyzing the trace information in an order reverse to the executed order of a stored program in accordance with the last stored address information in the trace information, and successively capturing trace information piece by piece so as to register the trace in formation in the trace analysis table; and inputting a program object code list/source code list and reconstructing an execution address and an instruction code corresponding to the trace information registered in the trace analysis table.

Another aspect of the present invention inheres in a processor which includes: a processor core module that includes a trace information output unit and reads in and executes processor instructions; a debug module that comprises a JTAG debugger interface and a tracer, which includes: a trace memory storing trace information of the program execution status; a trace information compression unit, which compresses the trace information into a predetermined trace format and stores the resulting compressed trace information in the trace memory piece by piece cyclically; and an address register, which stores the last stored address of the trace memory: and a main bus connected between the processor core module and the debug module, wherein a trace analyzing apparatus embedded JTAG debugger is connected to the JTAG debugger interface.

BRIEF DESCRIPTION OF DRAWINGS

FIG. 3 shows all trace information formats;

FIG. 4 shows a memory map of trace memory stored with trace information;

FIG. 7 is a flowchart schematically showing processing in step S3 of FIG. 5;

DETAILED DESCRIPTION OF THE INVENTION

Figure 1:
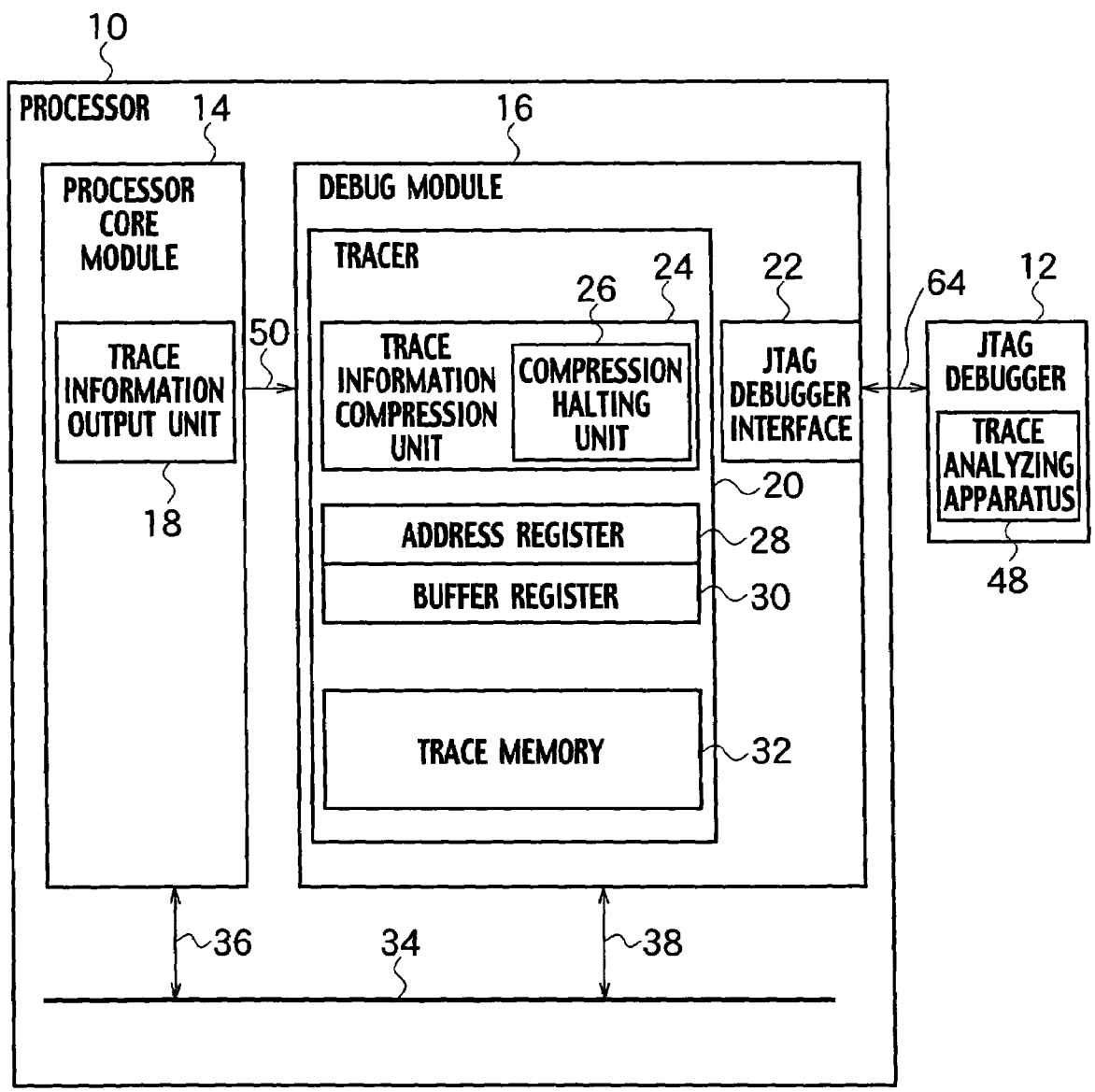
FIG. 1 is an overall schematic block diagram of a trace analyzing apparatus embedded JTAG debugger and a processor to be analyzed, according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

The embodiments shown below exemplify an apparatus and a method that are used to implement the technical ideas according to the present invention, and do not limit the technical ideas according to the present invention to those that appear below. These technical ideas, according to the present invention, may receive a variety of modifications that fall within the claims.

The embodiments of the present invention are described forthwith while referencing the drawings. The same or similar symbols are given to the same or similar parts throughout the appended drawings. However, it should be noted that the drawings are merely schematics that thickness, planar dimensions or the like of each block in each data format may differ from reality. Furthermore, parts with differing dimensions and/or differing ratios among the drawings may be included.

In addition, the embodiment given forthwith exemplifies devices and methods for embodying the technical ideas of the present invention, and those technical ideas are not limited to the following materials, shapes, structures, arrangements or the like. The technical ideas of the present invention may be modified into various modifications within the scope of the appended claims.

An embodiment of the present invention provides a trace analyzing apparatus and a trace analyzing method, which provide excellent program development support capability allowing an increase in the amount of trace information stored in a trace memory, and an increase in the number of codes needed for debugging.

According to a trace analyzing apparatus and a trace analyzing method of an embodiment of the present invention, storing data that indicates a trace information stored address in a trace memory is unnecessary. Therefore, the amount of trace information stored in the trace memory can be increased in addition to an increase in the number of codes needed for debugging.

Embodiment (Overall Structure)

An overall schematic block diagram of a trace analyzing apparatus 48 embedded JTAG debugger 12 and a processor 10 to be analyzed, according to the embodiment of the present invention, is shown in FIG. 1.

As shown in FIG. 1, the processor 10, according to the embodiment of the present invention, includes: a processor core module 14, which includes a trace information output unit 18; the tracer 20; a debug module 16, which includes a JTAG debugger interface 22; and a main bus 34, which connects between the processor core module 14 and the debug module 16 via buses 36 and 38.

The processor core module 14 reads in and executes processor instructions. The debug module 16 is connected to the external JTAG debugger 12 via the JTAG debugger interface 22 and a JTAG debug output bus 64, and is controllable by the external JTAG debugger 12 when in a debugging process.

The trace information output unit 18 in the processor core module 14 is connected to the tracer 20 via a trace information output data bus 50, receives information of the instruction execution status of the processor core module 14, and then outputs trace information to the tracer 20 in the debug module 16.

As shown in FIG. 1, the tracer 20 includes: trace memory 32, which stores trace information of the program execution status of the processor 10; a trace information compression unit 24, which compresses trace information into a predetermined trace format and stores the resulting compressed information in the trace memory 32 piece by piece cyclically; and an address register 28, which stores the last stored address of the trace memory 32. The tracer 20 analyzes the content of the trace memory 32 in reverse order to the program execution order, searches for a start or end of the trace format, and starts trace analysis therefrom in the program execution order.

The trace information compression unit 24 includes a compression halting unit 26, which halts compression of trace information, and may be configured to store trace information in a specific format in the trace memory 32 upon start and completion of a trace operation. In addition, the tracer 20 may naturally be embedded into the processor 10 to be traced.

(Trace Analyzing Apparatus)

Figure 2:
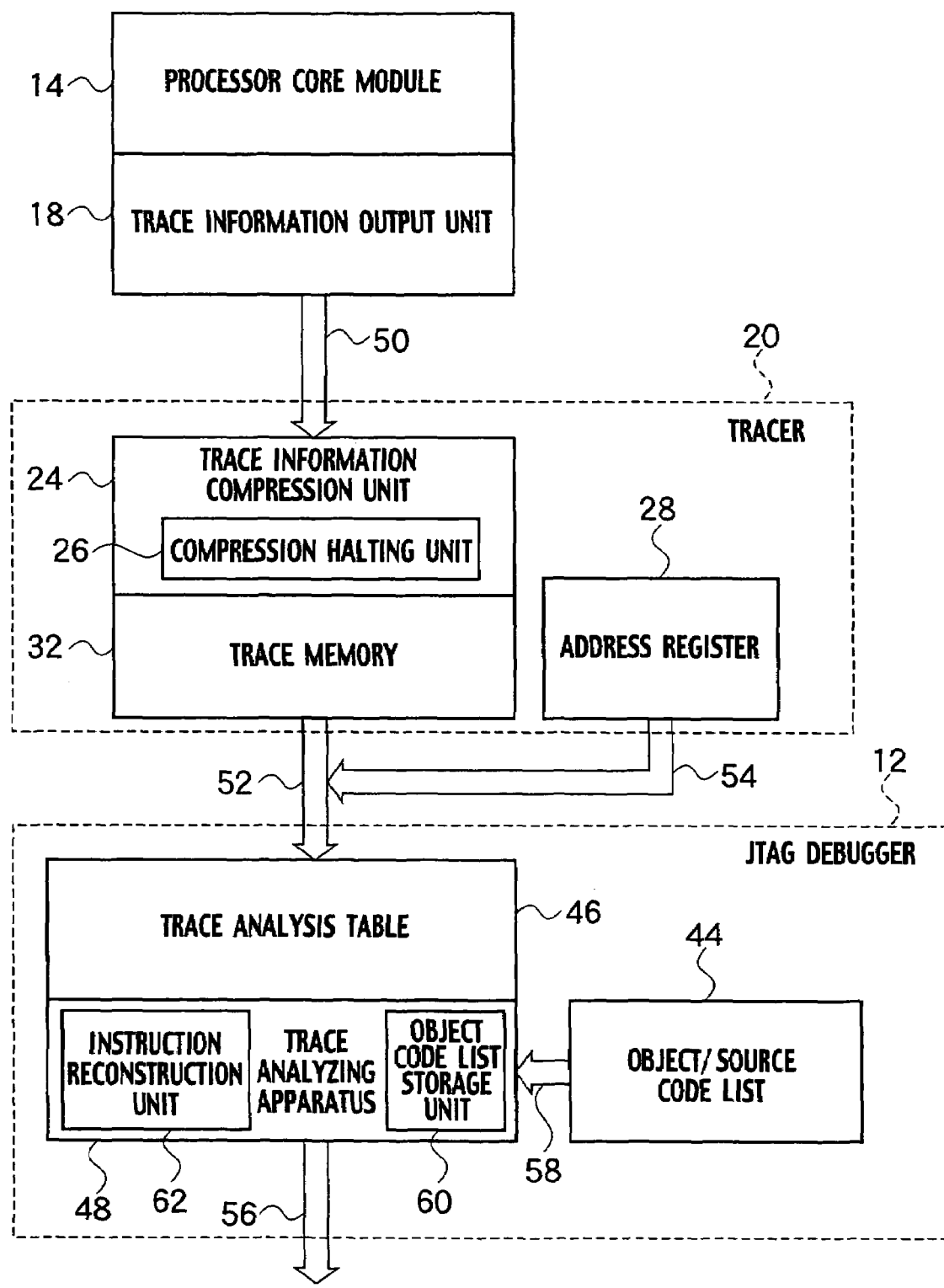
FIG. 2 is a schematic block diagram describing a data flow in a program analysis by the trace analyzing apparatus, according to the embodiment of the present invention.

As shown in FIG. 2, a trace analyzing apparatus 48, according to the embodiment of the present invention, is connected to the tracer 20 including the trace memory 32 that stores trace information and the address register 28 that stores last stored address information in the trace information and which includes a trace analysis table 46, which registers trace information, an object code list storage unit 60, which stores a program object/source code list, and an instruction restoration unit 62, which restores an execution address and an instruction code by reading out trace information stored in the trace analysis table 46 and the object/source code list stored in the object code list storage unit 60 in accordance with the last stored address of the trace information.

The trace analysis table 46 registers the program object/source code list 44 stored in the object code list storage unit 60 and trace information, which is provided by reading out trace information from the trace memory 32, analyzing the trace information indicated by the last stored address information in an order reverse to the executed order of the stored program, and capturing and reading the trace information out piece by piece.

The JTAG debugger 12, which analyzes the program executed by the processor core module 14, includes the trace analyzing apparatus 48, which connects to a trace memory read-out data bus 52 and a last stored address read-out data bus 54, and the object/source code list 44, as shown in FIG. 2. The trace analysis table 46, which inputs trace information, is embedded into the trace analyzing apparatus 48. The object/source code list 44 of the program being executed is input to the trace analyzing apparatus 48 via a bus 58.

In a trace operation, the trace information output unit 18 in the processor core module 14, which has executed a program, outputs trace information including instruction types, address information, data information, and an operating status of the trace information output unit 18. The tracer 20 then receives the trace information. The tracer 20 compresses the trace information received by the trace information compression unit 24, into data in a format shown in FIG. 3. The resulting compressed information is stored in the trace memory 32 successively.

Once the trace operation is completed, the JTAG debugger 12 reads out, from the tracer 20, the content of the trace memory 32 and the last stored address stored in the address register 28. The JTAG debugger 12 stores the object/source code list 44 of a program being executed by the processor core module 14 in the object code list storage unit 60 of the trace analyzing apparatus 48 via the bus 58. The JTAG debugger 12 analyzes the content of the trace memory 32 using a trace analysis program, and outputs, via a output data bus 56, the program execution status of the processor core module 14 being traced.

The tracer 20 receives trace information of the flow of a program executed by the processor core module 14 and data update information from the trace information output unit 18. The device 20 compresses and converts the trace information into a variable-length trace storage format, and stores the resulting compressed information in the trace memory 32 in cyclical order from the upper to the lower words.

The storage format is structured such that format type and format length can be uniquely determined from the lower bits thereof.

Since variable-length trace information stored in the trace memory 32 can be accurately captured backward from the time when tracing has been completed using the last stored address after the trace operation is completed, storing data indicating a trace information storage address in the trace memory 32 is unnecessary. Thus, the amount of trace information stored in the tracer 20 can be increased, and the performance of the tracer 20 is improved.

When carrying out debugging and processor evaluation analysis using the trace analyzing apparatus during processor development and/or processor embedded system development, trace information regarding the processor core module 14, such as an instruction execution address, an instruction indicating the program execution status of the processor core module 14 being traced, or read-out/write-in data from/to the data memory, and trace information of the status of the trace information output unit 18, are sent to the trace information compression unit 24. The trace information is compressed and converted by the trace information compression unit 24 and then stored at an address in the trace memory 32 indicated by the address register 28. Once tracing has been completed, the trace analyzing apparatus 48 inputs the trace information from the trace memory 32 and the last stored address information, which is a unit of trace information, from the address register 28, and captures and registers the trace information in the trace analysis table 46 piece by piece. The trace analyzing apparatus 48 reconstructs an execution address and an executed instruction from the trace information registered in the trace analysis table 46 while referencing address information of a branch instruction included in the trace information and an object code list of the program being executed by the processor core module 14. The trace analyzing apparatus 48 reconstructs the source code list and then outputs the program execution status to a display unit or the like when information of conversion between a reconstructed object code column and the source code list is available.

Since more information, such as the number of reconstructed program codes or data access information, facilitates debugging, a large capacity trace memory 32 is desired to store a large amount of trace information. The trace memory 32 is embedded in the processor 10 because externally capturing a signal using a high-speed processor 10 is difficult.

Trace information, which is compressed, converted to a predetermined format, and then stored, and last stored address information are input to the trace memory 32. The trace information is captured piece by piece in reverse order from the last stored address using type and length information indicated in the lower bits of the trace information. Then, the trace information is registered in the trace analysis table 46. The object/source code list 44 of the program executed by the processor core module 14 is input and the trace information in the trace analysis table 46 is analyzed, so as to reconstruct an execution address and an instruction code from the branch instruction trace information and the object code list and outputs the program execution status. Therefore, storing data that indicates a trace information stored address in the trace memory 32 is unnecessary. Therefore, the amount of trace information stored in the trace memory 32, increase in the number of codes needed for debugging, and provision of a processor with excellent program development support capability.

(Trace Format)

As shown in FIG. 3, compressed trace information is stored in the trace memory 32 in one of twelve formats. All formats are structured such that the entire format length can be determined by reading out from the lower bits.

The storage of trace information is described with an example of the processor core module 14 executing the following exemplary instruction sequence.

In the following description, 0x0100 on the left side denotes a hexadecimal address 100 in the program memory.

0x0100 add $2, 4
0x0102 sw $3, ($2)
0x0104 jmp $5; The content of Register 5 at this time is assumed to be 0x1000.

$$\vdots \quad \vdots$$
$$\vdots \quad \vdots$$
$$0 \times 0100 \text{ add } \$3,100$$
$$\vdots \quad \vdots$$

When the processor core module 14 executes an add instruction stored in the address 100, DPF2 is generated as trace information and then stored. Afterwards, when the processor core module 14 executes a sw instruction stored in the address 102, DPF2 is generated as trace information and then stored. Afterwards, when the processor core module 104 executes a jmp instruction stored in the address 104, DPF5 is generated as trace information and then stored. The trace information is successively stored in the trace memory 32 in order from the upper to the lower words without leaving vacant areas in the memory. In addition, if trace information to be stored is expected to extend over a word boundary, it is divided at the word boundary, and the resulting divided units of trace information are then stored in successive words, respectively. Furthermore, a word following the last word in the trace memory 32 is controlled to be the next start word in the trace memory 32, which is then cyclically stored with the next trace information.

Since the embedded trace memory 32 has a limited capacity, the trace information to be input to the trace analyzing apparatus 48, according to the embodiment of the present invention, is compressed into a variable length format shown in FIG. 3 by the trace information compression unit 24, and is stored to extend over a byte and a word boundary in the trace memory 32 without leaving vacant areas in the memory, by a trace information storage mechanism not shown in the drawing. Trace information obtained immediately after tracing has started and trace information obtained immediately before tracing is completed includes effective and valid information for debugging. Therefore, the trace information storage mechanism is configured to cyclically store trace information in the trace memory 32 in such a manner that when a next address in which next trace information is to be stored exceeds the end address of the trace memory, the start address thereof is set to that next address. This allows an increase in the amount of trace information stored in the trace memory 32.

Compressed variable length formats shown in FIG. 3 are defined such that format type and the entire format length may be found through successive analysis from the lower bits. The contribution of those formats is generally described forthwith.

Format 1 (DPF1) indicates that an instruction has not been executed by the processor core module 14 or the like.

Format 2 (DPF2) indicates that an instruction other than branch instructions has been executed by the processor core module 14.

Format 3 (DPF3) indicates that a branch instruction that has a branch destination address statically determined from the object code of an executed program has been executed. Here, DPF3 is expressed as 'static branch format'.

Format 4 (DPF4) indicates that a branch instruction or a branch operation, with a branch destination address being the same as the upper 16 bits of the current execution address, has been executed, and includes 3-bit information indicating 15 bits of the lower 16 bits in the address (since the shortest instruction length for the processor 10 is 16 bits, the lowest bit is unused), branch instruction type, and the like. Here, DPF4 is expressed as 'dynamic branch format'.

Format 5 (DPF5) indicates that a branch instruction or a branch operation having a branch destination address differing from the upper 16 bits of the current execution address has been executed, and includes 3-bit information indicating 31 bits of the 32-bit branch destination address, type of branch instruction and branch operation, and the like. Here, DPF5 is expressed as 'branch format'.

Format 6 (DPF6) indicates an available range of trace information stored in the trace memory 32 immediately after start of the trace operation and immediately after completion of the trace operation. Here, DPF6 is expressed as 'trace start/completion format'.

Formats DDF1 to DDF6 are used for indicating trace information obtained under data tracing conditions during a trace operation, and indicate an address or data accessed according to a trace memory 32 access instruction, which is typically stored right after format 2 (DPF2), which indicates that a memory access instruction has been executed.

(Tracing Operation of Tracer)

An operation of the tracer 20 is described taking the trace information content stored in the trace memory 32, shown in FIG. 4, as an example. Note that since an analysis procedure in a program execution order is the focus in the following description, detailed descriptions of the above formats are omitted; however, DDF4 included in the trace information shown in FIG. 4 is a format indicating data through a data trace operation, and includes 16-bit data and 2-bit information indicating a relationship between complete data access and those 16 bits.

When a trace operation starts, the tracer 20 generates DPF6, and initializes the address register 28 to zero and the buffer register 30 to zero. Afterwards, the tracer stores the DPF6 in the most significant bit of the buffer register 30, and increments the value of the address register 28 by 5 or the DPF6 format length (see DPF6 in FIG. 3).

The bit address of the least significant bit in the 64-bit buffer register 30 is 0 while the bit address of the most significant bit is 63. When the address register 28 points to a bit address in the buffer register 30 or a bit address in the trace memory 32, the lower 6 bits of the address register 28 are inverted and then used. In the following, the description of the inverted outputs used as an address is omitted. In other words, the lower 6 bits of 0 means the most significant bit or the 63-th bit. On the other hand, the lower 6 bits of 63 means the least significant bit or the 0-th bit.

Afterwards, trace information of an instruction not yet executed due to a stall cycle is output from the processor core module 14 and then input to the tracer 20. The trace information compression unit 24 then generates and stores DPF1 in an address of the buffer register 30 to which the address register 28 points, and increments the value of the address register 28 by 1 (see DPF1 in FIG. 3).

In the next cycle, the similar trace information is output, and DPF1 is then stored in the same manner.

In the next cycle, since trace information of a branch instruction is output from the processor core module 14, the trace information compression unit 24 then activates the compression halting unit 26 to generate DPF4 or DPF5. In this case, since the upper 16 bits of a branch destination address differ from those of the instruction execution address, trace information is generated in a DPF5 format. The resulting generated data is stored in an address of the buffer register 30 to which the address register 28 points, and the value of the address register 28 is then incremented by 39 (see DPF5 in FIG. 3).

In the subsequent 8 cycles, compressing trace information, storing the resulting compressed information in an address of the buffer register 30 to which the address register 28 points, and updating the value of the address register 28 are repeated in response to the outputs from the trace information output unit 18 in the processor core module 14.

In the subsequent cycles, since information of a branch instruction, which includes a branch destination address that can be statically determined from the program object codes, is output from the trace information output unit 18 in the processor core module 14. The trace information compression unit 24 then compresses the address information, generates and stores DPF3 in an address of the buffer register 30 to which the address register 28 points, and increments the value of the address register 28 by 5 (see DPF3 in FIG. 3).

In the subsequent 2 cycles, since no instructions are executed by the processor core module 14, DPF1 is stored. In this case, when DPF1 in the second cycle is stored, and the value of the address register 28 is updated, the value of the address register 28, except for the lower 6 bits, is incremented and the lower 6 bits are 0. Therefore, the content of the buffer register 30 is stored in the start word of the trace memory 32, and the buffer register 30 is initialized.

In the next cycle, since trace information of an instruction, whose next program execution address is successive being executed, is output from the trace information output unit 18 in the processor core module 14, the trace information compression unit 24 then generates and stores DPF2 in an address of the buffer register 30 to which the lower 6 bits of the address register 28 point, and increments the value of the address register 28 by 2 (see DPF2 in FIG. 3).

In the subsequent 5 cycles, compressing trace information, storing the resulting compressed information in an address of the buffer register 30 to which the lower 6 bits of the address register 28 point, and then updating the value of the address register 28 are repeated in response to the outputs from the trace information output unit 18 in the processor core module 14.

Since the instruction in the fifth cycle is a Load instruction and, accordingly, data is read out from a predetermined address set in the trace information output unit 18, the trace information compression unit 24 then successively generates DDF4 including 16-bit data information, stores DDF4 in an address of the buffer register 30 to which the lower 6 bits of the address register 28 point, and increments the value of the address register 28 by 25 (see DDF4 in FIG. 3).

In the subsequent 10 cycles, compressing trace information, storing the resulting compressed information in an address of the buffer register 30 to which the lower 6 bits of the address register 28 point, and updating the value of the address register 28 are repeated in response to the outputs from the trace information output unit 18 in the processor core module 14.

In the next cycle, since trace information of a branch instruction is output from the processor core module 14, and the upper 16 bits of a branch destination address differ from those of the instruction execution address, the trace information compression unit 24 generates and stores trace information in a DPF5 format in an address of the buffer register 30 to which the lower 6 bits of the address register 28 point, and increments the value of the address register 28 by 39 (see DPF5 in FIG. 3). At this time, since the value of the address register 28, except for the lower 6 bits, is incremented and the lower 6 bits are not zero, DPF5 is divided at a bit position which allows storage of the upper bits of DPF5 in the buffer register 30. The trace information in the divided upper bits is stored in the buffer register 30 and also in the second word from the start address of the trace memory 32, and the buffer register 30 is then initialized. The value of the divided lower bits in DPF5 is then stored in the buffer register 30.

In the subsequent 23 cycles, compressing trace information, storing the resulting compressed information in an address of the buffer register 30 to which the lower 6 bits of the address register 28 point, and updating the value of the address register 28 are repeated in response to the outputs from the trace information output unit 18 in the processor core module 14, thereby increasing the value of the address register 28 except for the lower 6 bits which are zero. Therefore, the content of the buffer register 30 is stored in the third word from the start address of the trace memory 32, and the buffer register 30 is then initialized.

In the subsequent cycle, since no instructions are executed by the processor core module 14, DPF1 is stored in the buffer register 30, and the value of the address register 28 is incremented by 1 (see DPF1 in FIG. 3).

When completion of the trace operation is detected, the tracer 20 generates and stores DPF6 in an address of the buffer register 30 to which the address register 28 points, increments the value of the address register 28 by 5, and stores the content of the buffer register 30 in the fourth word from the start address of the trace memory 32 (see DPF6 in FIG. 3).

Figure 8A:
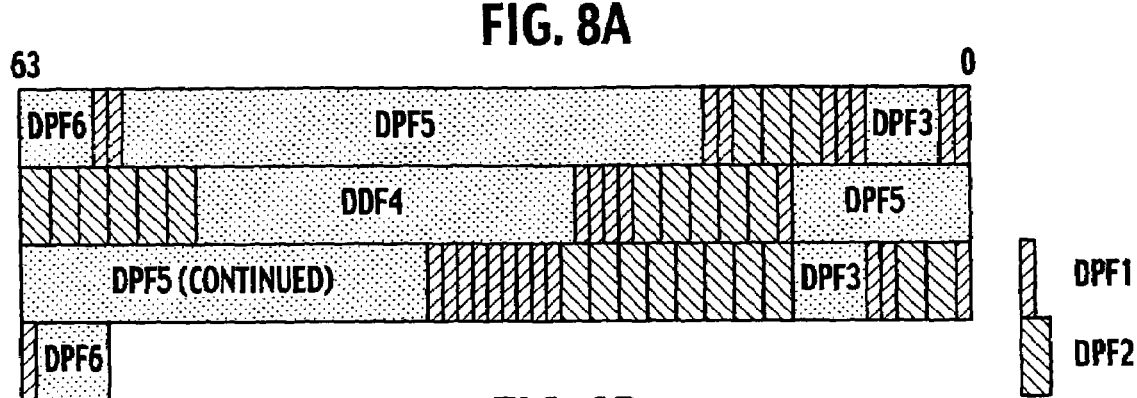
FIG. 8A shows a memory map of trace memory.
Figure 8B:
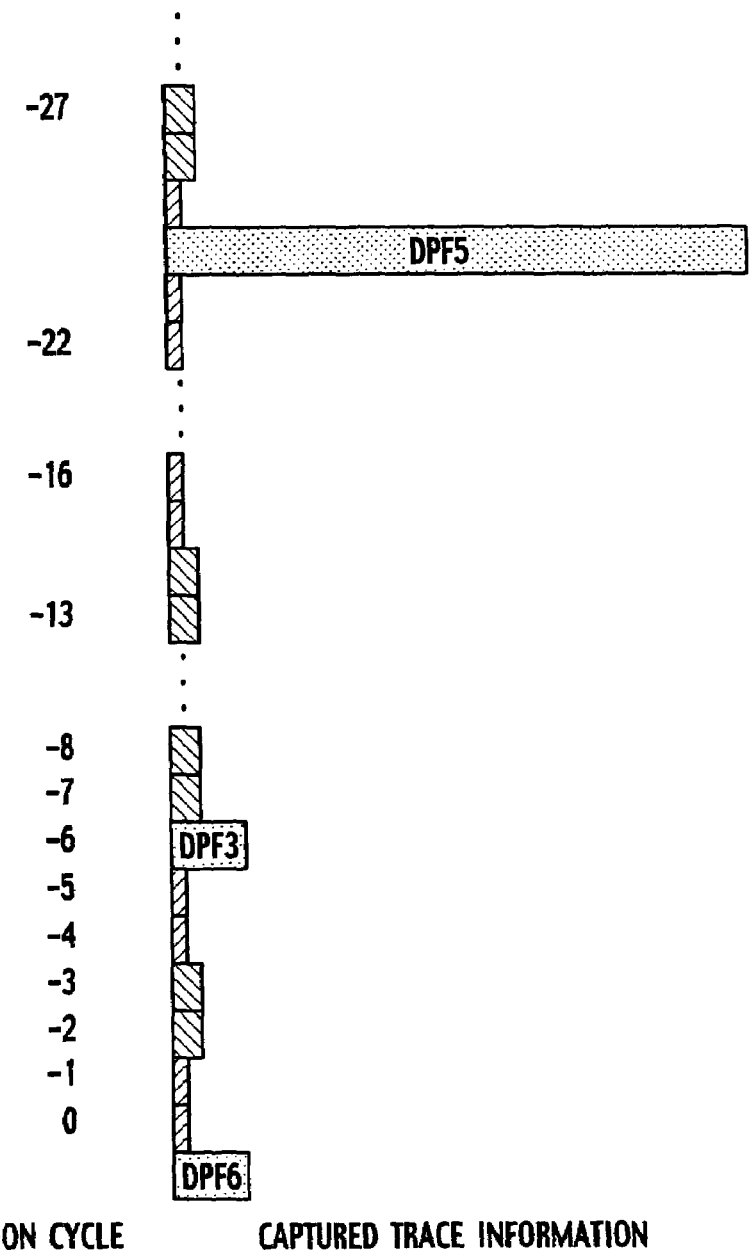
FIG. 8B shows how trace information is captured in each cycle.
Figures 9A, 9B:
FIG. 9A shows trace information registered in a trace analysis table.
FIG. 9B shows how trace information changes through analysis.

A memory map of the trace memory and how trace information is captured in each cycle are represented as shown in FIGS. 8A and 8B, respectively. In addition, trace information registered in a trace analysis table and how trace information changes through analysis are represented as shown in FIGS. 9A and 9B, respectively.

Although the trace information stored in the trace memory 32 has variable length, capture of trace information in each cycle is possible by successively reading the trace memory 32 in the address increasing order from the last stored address and using information of the entire length of trace information formats, which are indicated by the lower bits of the trace information, to find the next trace information storage address (in a previous execution cycle) as shown in FIG. 8.

In this manner, when capturing trace information from the trace memory 32, if trace information of DPF6 is found, this means that the starting point of the trace operation has been reached. If information of DPF6 cannot be found even when capturing trace information in the start word of the trace memory 32, this means that the trace memory 32 is cyclically used and that the trace information can be captured from the last word of the trace memory 32.

Since the trace analyzing apparatus, according to the embodiment of the present invention, through application to such tracer 20, can accurately capture trace information from the last stored address even when only compressed variable-length trace information is stored in the trace memory 32, storing information of the trace information stored address in the trace memory 32 is unnecessary. Therefore, the amount of trace information stored in the trace memory 32 can be increased and provision of the processor 10 with high functionality, allows shorter-time development of a processor embedded application system.

In addition, the trace analyzing apparatus, through application to such tracer 20, allows capture of each trace information without storing a trace information stored address in the trace memory 32, resulting in an increase in the amount of trace information stored in the trace memory 32.

Furthermore, the trace analyzing apparatus embedded in the processor 10, through application to such tracer 20, allows capture of trace information of the high-speed processor 10.

Once a trace operation starts or the amount of trace information in a branch destination address information compressed format exceeds a specific capacity, the trace information of a branch instruction may be stored in a branch destination address information non-compressed format. For example, when compressing and storing branch instruction address information in DPF3 or DPF4 (compressing the difference between the lower 15 bits [15:1] of an instruction execution address and those of a branch destination address using address information when the upper 16 bits of the former and those of the latter are the same), if the total amount of stored trace information exceeds a specific value, a branch instruction trace information is not stored in a DPF5 format. Even if requirements for compressing into a DPF3 or a DPF4 format are satisfied, the branch instruction trace information is stored in the DPF5 format.

Such control decreases the amount of stored trace information, but allows storage of an appropriate amount of trace information even for program analysis through which no DPF5 is generated in the trace memory 32, and provision of the processor 10 with high functionality, which allows shorter-time development of a processor embedded application system. Improved accuracy restoration of a program execution status is possible after compressing branch address information of the program and storing the resulting trace information.

The trace information may be limited to that related to each instruction executed by the processor 10. For example, not storing trace information when the processor core module 14 does not execute any instructions due to a stall cycle causes loss of information of the number of execution cycles of the processor core module 14, but allows storage of more trace information of executed instructions of a program in the trace memory 32, and provision of the processor 10 with high functionality, which allows shorter-time development of a processor embedded application system. Limitation of trace information to that related to instructions executed by the processor core module 14 allows an increase in the amount of trace information stored in the trace memory 32.

The trace analyzing apparatus according to the embodiment of the present invention, inputs the trace information of the program execution status of the processor core module 14. The trace information is compressed and converted into a pre-established format and stored in the trace memory 32 with the last stored address information. The trace analyzing apparatus successively captures the trace information in reverse order from the last stored address using type and length information indicated in the lower bits of the trace information, registering the resulting data in the trace analysis table 46. Furthermore, since the program execution status can be output by inputting the object code list of the program being executed by the processor core module 14 and analyzing and reconstructing the trace information in the trace analysis table 46 into an execution address and an instruction code, storing data that indicates a trace information stored address in the trace memory 32 is unnecessary. Thus, the amount of trace information stored in the trace memory 32 can be increased, as can the number of codes needed for debugging, and a processor with excellent program development support capability.

(Trace Analyzing Method)

Figure 5:
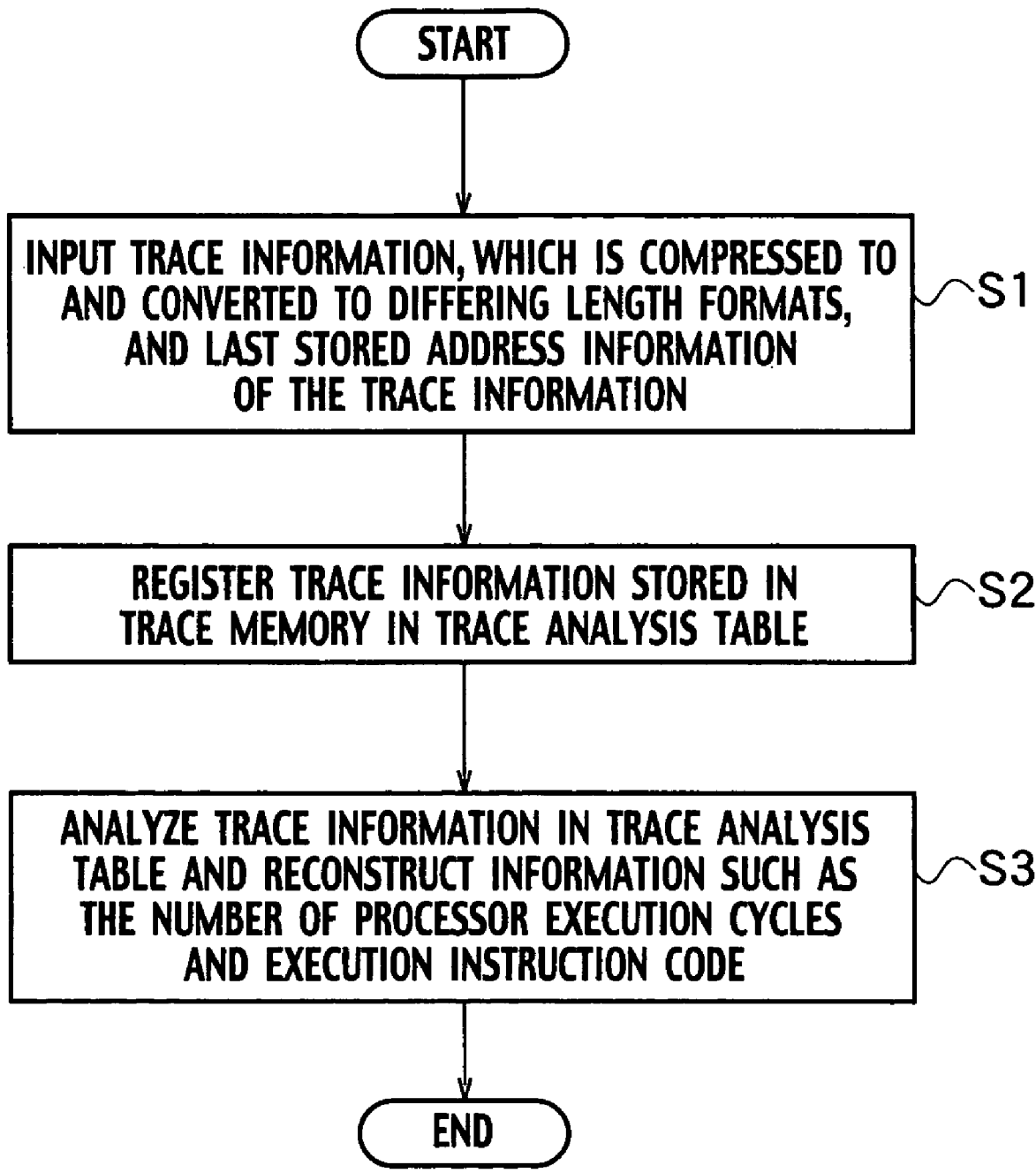
FIG. 5 is a flowchart showing the main procedures of a trace analyzing apparatus.
Figure 6:
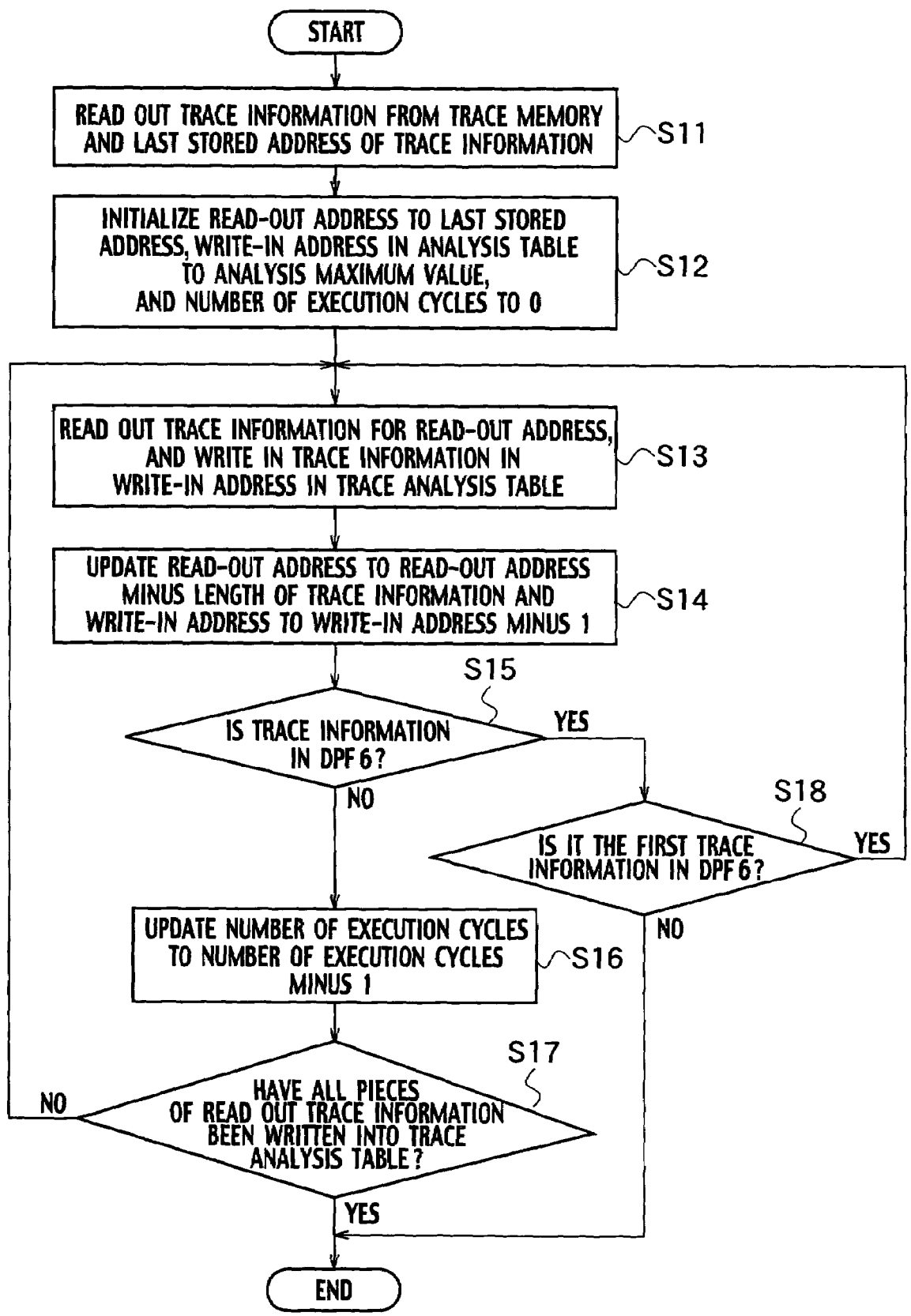
FIG. 6 is a flowchart schematically showing processing in steps S1 and S2 of FIG. 5.

Main processing procedures in a trace analyzing method, according to an embodiment of the present invention, may be represented with flowcharts, as shown in FIGS. 5 through 7.

The trace analyzing method, according to the embodiment of the present invention, as shown in FIG. 5, includes: step S1 of inputting trace information, which is compressed and converted to differing length formats, to a trace analysis table in accordance with last stored address information in the trace information; step S2 of analyzing the trace information in an order reverse to the executed order of a stored program in accordance with the last stored address information in the trace information, successively capturing the trace information piece by piece, and registering it in the trace analysis table; and step S3 of inputting a program object code list/source code list and reconstructing an execution address and an information code of the trace information registered in the trace analysis table.

The step S2 of registering in the trace analysis table, as shown in FIG. 6, includes: step S11 of capturing and reading out the trace information for each format in order of decreasing read-out address; step S15 of determining whether it is the first piece of information in trace start/completion format (DPF6) when the trace information is in trace start/completion format (DPF6); step S18 of capturing and registering the next trace information when it is the first piece of information in trace start/completion format (DPF6); and a step of completing registration in the trace analysis table when the first piece of information is not in trace start/completion format (DPF6).

The reconstructing step S3, as shown in FIG. 7, includes: step S102 of obtaining, from the program object code list/source list, an information code of the trace information in which execution address information is registered and registering the obtained information code in the trace analysis table; step S106 of obtaining the execution address of the next trace information from an instruction code size when the instruction code is not a branch instruction; step S107 of obtaining branch destination address information from the object code list when the instruction code is a branch instruction and the trace information is in static branch format DPF3, and obtaining a branch instruction execution address of the address information being analyzed and branch destination address information so as to obtain an execution address of the next trace information when the trace information is in dynamic format DPF4; and step S114 of comparing the object code list to the source list so as to reconstruct the executed program when corresponding information between the object code list and the source list can be found.

Main analysis procedures of the trace analyzing apparatus are given in FIG. 5.

To begin with, in step S1, trace information compressed and converted into differing length formats and last stored address information of the trace information are input to the JTAG debugger 12.

In step S2, trace information stored in the trace memory 32 is registered in the trace analysis table 46.

In step S3, the trace information in the trace analysis table 46 is analyzed and information of the number of execution cycles of the processor core module 14 and execution instruction codes are reconstructed.

Regarding step S2 of FIG. 5, FIG. 8A is a memory map of the trace memory 32, and FIG. 8B is a diagram showing relationships of trace information captured in every cycle. Regarding step S3 of FIG. 5, FIG. 9A shows how trace information is registered in the trace analysis table, and FIG. 9B is a diagram describing how to reconstruct program execution information as analysis progresses.

An operation of the trace analyzing apparatus is described taking a case of inputting the trace information stored in the trace memory shown in FIG. 4 as an example.

When the trace operation is completed, the trace analyzing apparatus inputs trace information from the trace memory, inputs last stored address information from an address register so as to capture and register the trace information piece by piece in the trace analysis table, as shown in steps S1 and S2 of FIG. 5, and inputs the object code list as shown in step S3 so as to reconstruct and output the trace information in the trace analysis table as program execution information.

(Steps S1 and S2 in FIG. 5)

The processing procedure of steps S1 and S2 shown in FIG. 5 is schematically described using FIG. 6.

In step S11, trace information stored in the trace memory 32 and the last stored address of the trace information are read to the trace analysis table 48.

In step S12, various access pointers are initialized. The last stored address read in step S11 is used as a read-out address for the trace information read into the trace analyzing apparatus 48, the maximum address of the trace analysis table 46 presumable from the trace memory size is used as a write-in address in the trace analysis table 46, and the number of execution cycles is set to 0.

In step S13, the trace information read in the address decreasing order from the address indicated by a read-out address is read out, and the trace information is captured and read out for each unit determinable from the format.

The read out trace information is registered in the trace analyzing table 46 indicated by the write-in address. Reading out the read in trace information is controlled like data stored in the shift register with the trace memory size, which has the last stored address as a final address.

In other words, the trace information after being stored in the memory of the trace analyzing apparatus 48 is controlled so that data can be read out, while ignoring a word and a byte boundary when the read-out addresses successively decrease. In addition, when the trace memory 32 is used cyclically and if a read-out address is −1, an address value for the trace memory size is set to the read-out address, and then the trace information is controlled so that a read out operation can continue.

In step S14, the read-out address is decreased just by the length of the trace information read out, the write-in address for the trace analysis table 46 is decreased by 1, and the pointers corresponding to capture and register of the next trace information are, accordingly, updated. Note that the read-out address is controlled at the time of update in the manner described above.

In step S15, it is determined whether the read out trace information is DPF6, which indicates start and completion of a trace operation.

When the read out trace information is not DPF6 in step S15, the number of execution cycles is reduced by 1 and data to be registered in the trace analysis table 46 is updated in step S16.

In step S17, it is determined whether capturing trace information and registering it in the trace analysis table 46 has been completed. Details of this step are not shown in the drawing, but it is generally processed as follows.

When the trace memory 32 is not used cyclically, it is determined whether the read-out address is 4 bits or less. If the answer is YES and if the second piece of information in DPF6 is an address that cannot be captured through the next trace information processing, this signifies an error, and error processing is then carried out. If the read-out address is 5 bits or more, capturing and registering are assumed not to be completed, and the process returns to step S13.

When the trace memory 32 is used cyclically, capturing and registering are assumed not to be completed until the read-out address reaches 0, returning to step S13. However, after 0 is passed once and the read-out address is updated, when the read-out address is larger than a value resulting from adding 0x3F to the last stored address and masking the lower 6 bits, capturing and registering are assumed not to be completed and processing returns to step S13.

If the read-out address is equal to or less than the foregoing value, this means that capturing and registering is completed, and step S2 of FIG. 5 is then completed.

Note that when the read-out address is smaller, the last trace information to be registered includes an error in the upper bits and is therefore erased from the trace analysis table 46, address pointers are returned to one previous state, and step S2 of FIG. 5 is then completed.

When the trace information is in DPF6 in step S15, it is determined whether the trace information is the first piece of information in DPF6 in step S18.

When the trace information is the first piece of information in DPF6 in step S18, it is trace information indicating completion of a trace operation, which means that registering in the trace analysis table 46 has started. Processing then returns to step S13 so as to capture and register the next trace information.

When the trace information is not the first piece of information (it is the second piece of information) in DPF6 in step S18, it is trace information indicating start of a trace operation. Therefore, capturing and registering in the trace analysis table in step S2 of FIG. 5 is completed. (Step S3 in FIG. 5)

The processing procedure of step S3 shown in FIG. 5 is schematically described using FIG. 7.

In step S101, trace information in format DPF5 registered in the trace analysis table 46 is examined from the top of the trace analysis table 46 in which the trace information is registered.

In step S102, branch destination address information in DPF5, which corresponds to an executed instruction subsequent to that corresponding to the found trace information in format DPF5, is registered as execution address information in the trace analysis table 46.

In step S103, an object/source code list 44 of the executed program is read in.

In step S104, an instruction code corresponding to the trace information, which includes registered execution address information, is obtained from the object code list and registered in the trace analysis table 46.

In step S105, it is determined whether the registered instruction code is a branch instruction.

If it is not a branch instruction in step S105, an execution address for the next trace information is found from the size of the instruction code in step S106, proceeding to step S108.

If the instruction code examined in step S105 is a branch instruction, branch destination address information is found so as to obtain the execution address for the next trace information, proceeding to step S108. In step S107, if the trace information is in DPF3, branch destination address information is then found from the object code list, and otherwise, if the trace information is in DPF4 format, a branch instruction execution address of the 16-bit (15 bits plus a lowest bit of 0) address information being analyzed and branch destination address information are then found so as to obtain an execution address for the next trace information, proceeding to step S108.

In step S108, it is determined whether trace information for an executed instruction exists in the subsequent cycle to the currently analyzed trace information.

If trace information for an executed instruction exists, execution address information is registered to that trace information in step S109, and processing returns to step S104. If trace information for an executed instruction is not found until the last address in the analysis table, processing proceeds to step S110.

In step S110, it is determined whether information not registered with an execution address exists in the trace information, indicating that the instructions registered in the trace analysis table 46 have been executed.

If execution addresses have been registered to the trace information for all executed instructions, processing proceeds to step S114.

If trace information for an executed instruction not registered with an execution address exists, it is determined in step S111 whether an execution address can be determined from information during trace execution.

For example, if trace information exists from the start of a trace operation (if there are two pieces of information in DPF6), program execution address information from the start of the trace operation may be determined.

If there is no trace information that allows determination of an execution address, analysis of the remaining trace information is suspended, and in step S112, start information for displaying the results of analyzing the trace analysis table 46 is changed to that for an instruction execution cycle immediately before the instruction code is determined, proceeding to step S114.

If an execution address information is determined in step S112, execution address information is registered to the instruction execution trace information in step S113, and processing returns to step S104.

Instep S114, if corresponding information between the object code list and the source list can be found, the results of comparing the source list to a displayable object code list and then reconstructing the execution program are output, and therefore step S3 of FIG. 5 is completed.

In this manner, the trace analyzing apparatus using the trace analyzing method, according to the embodiment of the present invention, can reconstruct an execution program from the trace information read out from the trace memory, which is stored with only compressed trace information that is obtained by compressing and converting trace information to differing length formats and display the trace information. It is unnecessary to store trace information, such as start position information for the trace information, in the trace memory. Therefore, the amount of trace information stored in the trace memory can be increased, as can an increase in the number of codes needed for debugging. Thus, a processor is provided with excellent program development support capability.

Other Embodiments

The present invention has been described above according to the embodiment; however, it should not be perceived that descriptions forming part of this disclosure and the drawings are intended to limit the spirit and scope of the present invention. Various alternative embodiments, working examples, and operational techniques will become apparent from this disclosure for those skilled in the art.

In this manner, the present invention naturally includes various embodiments not described herein. Accordingly, the technical scope of the present invention is determined only by specified features of the invention according to appended claims that can be regarded appropriate from the above-mentioned descriptions.

While the present invention is described in accordance with the aforementioned embodiments, it should not be understood that the description and drawings that configure part of this disclosure are to limit the present invention. This disclosure makes clear a variety of alternative embodiments, working examples, and operational techniques for those skilled in the art. Accordingly, the technical scope of the present invention is defined by only the claims that appear appropriate from the above explanation.

Various modifications will become possible for those skilled in the art after receiving the teachings of the present disclosure without departing from the scope thereof.

What is claimed is:

1. A trace analyzing apparatus comprising:
   a trace analysis table that registers trace information;
   an object code list storage unit that stores a program object/source code list; and
   an instruction reconstruction unit that is connected to the trace analysis table and the object code list for analyzing the trace information,
   wherein the trace analyzing apparatus is connected to a tracer, and
   wherein the trace analysis table registers the program object/source code list stored in the object code list storage unit and trace information obtained by reading out trace information from the trace memory, to analyze the trace information indicated by last stored address information in an order reverse to the executed order of a stored program, and successively captures and reads the trace information out piece by piece.

2. A trace analyzing apparatus comprising:
   a trace analysis table that registers trace information;
   an object code list storage unit that stores a program object/source code list; and
   an instruction reconstruction unit that is connected to the trace analysis table and the object code list for analyzing the trace information,
   wherein the trace analyzing apparatus is connected to a tracer, and
   wherein the tracer comprises:
   a trace memory storing trace information of a program execution status of a processor cyclically and successively; and
   an address register that retains an address last stored in the trace memory.

3. The trace analyzing apparatus of claim 2, wherein the tracer further comprises:
   a trace information compression unit that compresses trace information to a pre-established trace format and stores the resulting trace information in the trace memory.

4. The trace analyzing apparatus of claim 3, wherein the trace information compression unit further comprises:
   a compression halting unit that halts compression of trace information.

5. A trace analyzing method, comprising:
   inputting trace information, which is compressed and converted to differing length formats, to a trace analysis table in accordance with last stored address information in the trace information;
   analyzing the trace information in an order reverse to the executed order of a stored program in accordance with the last stored address information in the trace information, and successively capturing trace information piece by piece so as to register the trace in formation in the trace analysis table; and
   inputting a program object code list/source code list and reconstructing an execution address and an instruction code corresponding to the trace information registered in the trace analysis table.

6. The method of claim 5, wherein the registering in the trace analysis table further comprises:
   capturing and reading out the trace information for each format in order of decreasing read-out address.

7. The method of claim 6, wherein the registering in the trace analysis table further comprises:
   determining whether the trace information is the first piece of information in trace staff/completion format when the trace information is in trace start/completion format.

8. The method of claim 7, wherein the registering in the trace analysis table further comprises:
   capturing and registering the next trace information when the next trace information is the first piece of information in trace start/completion format.

9. The method of claim 8, wherein the registering in the trace analysis table further comprises:
   completing registering in the trace analysis table when the first piece of information is not in trace start/completion format.

10. The method of claim 9, wherein the reconstructing further comprises:
    obtaining from the object code list an instruction code for the trace information, which includes registered execution address information, and registering it in the trace analysis table.

11. The method of claim 10, wherein the reconstructing further comprises:
    obtaining from the size of an instruction code an execution address for the next trace information when the instruction code is not a branch instruction.

12. The method of claim 11, wherein the reconstructing further comprises:
    obtaining branch destination address information from the object code list when the trace information is in a static branch format; and
    obtaining a branch instruction execution address of address information being analyzed and branch destination address information so as to obtain an execution address of the next trace information when the trace information is in a dynamic format.

13. The method of claim 12, wherein the reconstructing further comprises:
corresponding the object code list to the source list so as to reconstruct the executed program when corresponding information between the object code list and the source list can be determined.

14. A processor comprising:
a processor core module that includes a trace information output unit and reads in and executes processor instructions;
a debug module that comprises a JTAG debugger interface and a tracer, which includes:
a trace memory storing trace information of the program execution status;
a trace information compression unit, which compresses the trace information into a predetermined trace format and stores the resulting compressed trace information in the trace memory piece by piece cyclically; and
an address register, which stores the last stored address of the trace memory; and
a bus connected between the processor core module and the debug module,
wherein a trace analyzing apparatus embedded JTAG debugger is connected to the JTAG debugger interface, and
wherein the trace analysis table registers the program object/source code list from the object code list storage unit, and
the trace analysis table registers trace information obtained by reading out trace information from the trace memory, analyzing the trace information indicated by last stored address information in reverse order to the executed order of a stored program, and successively capturing and reading the trace information out piece by piece.

* * * * *